United States Patent [19]
Anderson

[11] 3,750,164
[45] July 31, 1973

[54] MARINE RADAR WITH T-V RECEIVER DISPLAY
[76] Inventor: Tore N. Anderson, High Ridge Rd., Brookfield Center, Conn. 06805
[22] Filed: July 20, 1971
[21] Appl. No.: 164,348

[52] U.S. Cl............................. 343/5 R, 343/6 TV
[51] Int. Cl.............................................. G01s 9/00
[58] Field of Search................ 343/6 TV, 5 SC, 17, 343/10, 11

[56] References Cited
UNITED STATES PATENTS
3,016,530  1/1962  Skidmore.......................... 343/10 X Primary Examiner—Benjamin A. Borchelt
Assistant Examiner—H. A. Birmiel
Attorney—Michael Ebert et al.

[57] ABSTRACT

A marine radar system for small boats, the system making use of a conventional T-V receiver for the display of the radar picture. The radar system includes an antenna adapted to periodically scan a predetermined azimuthal sector with a beam of radar pulses whose repetition rate corresponds to the horizontal line scanning rate of the receiver, and means to generate a local carrier whose frequency corresponds to that of an unoccupied channel of the receiver. Echo signals produced by targets lying within the sector are intercepted by the antenna. These echo signals together with horizontal sync signals corresponding in frequency to the repetition rate of the radar pulses, and vertical sync signals corresponding to the antenna scanning rate are applied as modulation components on the local carrier to create a composite video signal simulating a T-V signal. The composite video signal is fed to the T-V receiver to provide a presentation on the cathode-ray tube thereof, whereby the triangular sector scanned by the radar is converted into a rectangular picture in which targets close to the radar site are expanded relative to those remote therefrom.

8 Claims, 9 Drawing Figures

Radar Scan For TV Presentation

Actual Map Scale

INVENTOR
TORE N. ANDERSON

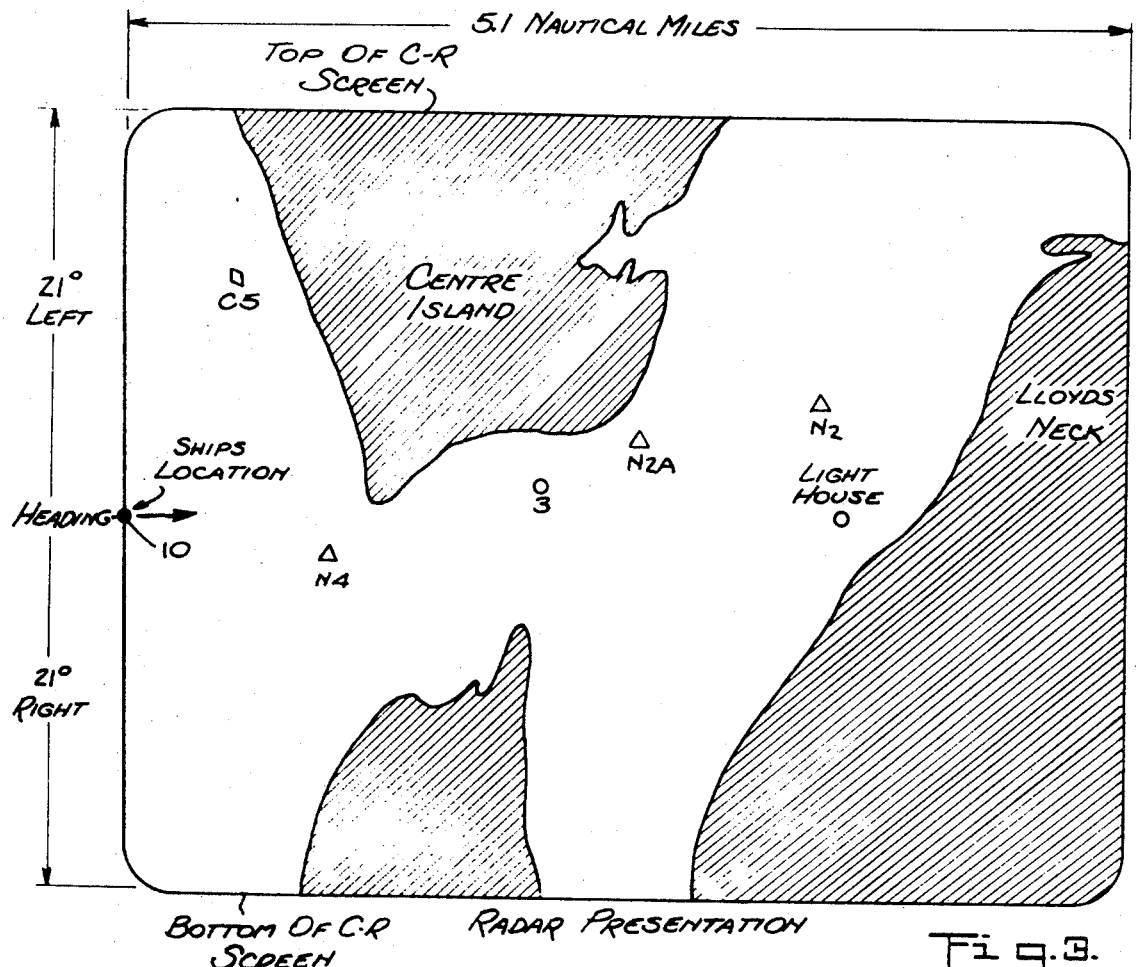
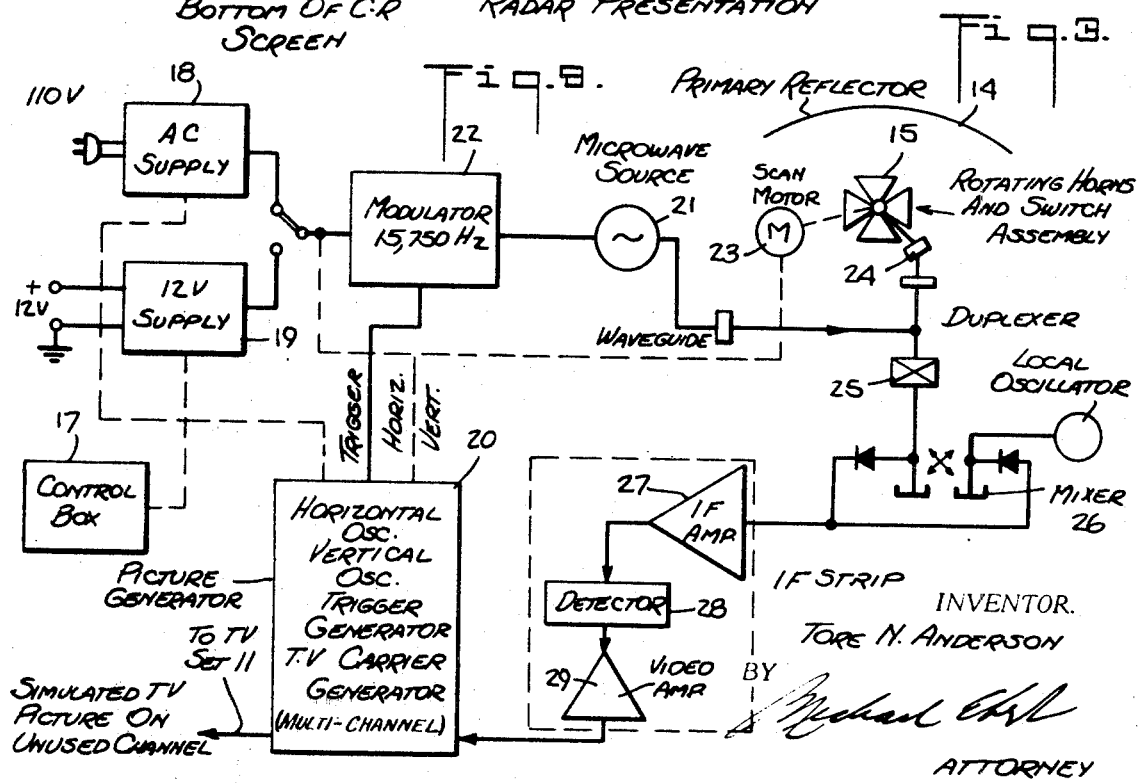

INVENTOR.
TORE N. ANDERSON
BY
ATTORNEY

MARINE RADAR WITH T-V RECEIVER DISPLAY

BACKGROUND OF THE INVENTION

This invention relates generally to radar systems, and in particular to a pulse-echo radar system for marine applications which makes use of a conventional television receiver as a target display device.

Radio energy is propagated at the velocity of light. By measuring the time it takes for radio energy to reach a target and to be reflected back to the radar site, the range of the target may readily be determined. A radar system must, therefore, incorporate a timing device to determine the interval elapsing between the transmission of a quantum of radio energy and the reception of its echo from the target. In pulse radar, this is achieved by transmitting discrete pulses of energy of microsecond duration, at a repetition rate which is such that the reflected signals from the most distant target in the range are received before the next pulse is transmitted.

In radar, the indication of the presence, location and range of detected targets is generally presented on a cathode-ray tube display device. In the Plan Position Indicator radar system (PPI), echoes appear as bright points or areas on the face of the cathode tube and have the same position relative to the origin (tube center) as the target objects have to the radar site. The PPI type of radar system is, therefore, widely used in marine applications for navigation purposes. On the screen of the PPI tube, there are displayed in polar coordinates, the various ships, coastlines, lighthouses and other land masses and objects lying within the operating range of the system.

A PPI radar system is, however, a relatively costly instrument and represents an investment far beyond the means of most small boat owners. Hence while a system of this type is of great value for navigational purposes, most small boats lack a radar facility and run serious risks particularly when visibility is poor.

SUMMARY OF THE INVENTION

In view of the foregoing, it is the main object of the invention to provide a low-cost radar system which incorporates a standard T-V receiver as a display device and applies to the receiver a composite video signal that simulates a conventional T-V signal, resulting in a radar picture of the targets within the range of the system.

More specifically, it is an object of the invention to provide a system of the above type including a radar antenna which periodically scans a predetermined azimuthal sector, echo signals derived from targets lying with said sector constituting the image component of said composite video signal.

A significant feature of the invention resides in the fact that the composite video signal applied to the T-V receiver represents targets within a triangular sector, whereas the picture developed on the screen of the cathode-ray tube has a rectangular configuration, whereby the triangular sector is converted into a rectangular projection thereby expanding the image of targets in the proximity of the radar site relative to those remote therefrom. The resultant emphasis on close-in targets renders them more noticeable. This is of practical advantage as compared to a conventional radar system wherein close-in targets, which are normally of greater interest, are crowded together on the screen.

Also an object of the invention is to provide an efficient and yet inexpensive radar system for marine applications making use of a standard T-V receiver which is also capable of operating in the usual manner to present conventional programs, so that the owner has both a T-V set and a radar facility. The system in accordance with the invention, may be used with any commercially available T-V set. Obviously, the larger the T-V screen, the greater the radar image produced thereby.

Briefly stated, these objects are accomplished in a radar system having a scanning antenna which projects a beam of radar pulses having a repetition rate corresponding to the horizontal scanning rate of a standard T-V receiver serving as the radar display device, the antenna cyclically scanning a predetermined triangular sector at a rate corresponding to the vertical scanning rate of the receiver.

A picture generator is provided to produce a composite video signal simulating a conventional T-V signal. The generator includes means to produce a local carrier whose frequency corresponds to that of an unoccupied channel in the receiver, means to produce a horizontal sync signal in accordance with the radar pulse repetition rate and means to produce a vertical sync signal in accordance with the antenna scanning rate, the horizontal and vertical sync signals as well as the echo signal derived from the antenna, being imposed on the local carrier to create a composite video signal simulating a T-V signal.

The composite video signal representing targets lying within the triangular sector, is fed to the T-V receiver to develop on the cathode-ray screen thereof, a rectangular picture in which the triangular sector is converted into a rectangular projection, and in which close-in targets are expanded relative to distant targets.

OUTLINE OF THE DRAWING

For a better understanding of the invention as well as other objects and further features thereof, reference is made to the following detailed description to be read in conjunction with the accompanying drawing, wherein:

FIG. 3 illustrates a typical picture produced on the screen of a T-V receiver when using a radar system according to the invention;

Figure 4:
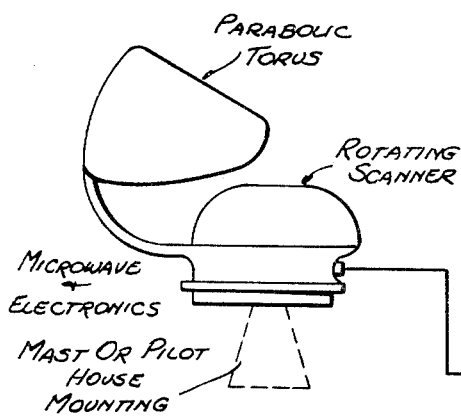

FIG. 4 schematically shows the main components of a preferred embodiment of a radar system in accordance with the invention;

FIGS. 5, 6, 7 and 8 are waveforms illustrative of conventional T-V signals having synchronization signal components; and FIG. 9 is a block diagram of a radar system according to the invention.

DESCRIPTION OF THE INVENTION

The radar system in accordance with the invention, employs a special scanning antenna and microwave assembly adapted to radiate a beam of periodic high-frequency pulses to cyclically scan a prescribed sector, and to receive echoes reflected from targets lying within the sector boundaries. The echoes are displayed on the cathode-ray screen of a standard U.S. television receiver. We shall, therefore, first consider the image analysis technique employed in a conventional television system.

The method employed in modern television systems for analyzing and synthesizing visual images is known as linear scanning. As applied to transmission, this involves exploring the image to be transmitted by an electron beam which transverses the image area in a series of horizontal lines, moving over every point in the image at a constant speed, and acting to discover the degree of brightness at each point in succession. The camera tube, which includes the scanning beam, generates a succession of electrical impulses corresponding to the successive values of spots discovered by the beam.

At the television receiver, the scanning process in the cathode-ray display tube involves moving the electron beam therein synchronously with the beam of the camera tube, the brightness of the cathode-ray beam being controlled by electrical impulses transmitted from the camera tube to the receiver, thereby recreating the image seen by the camera tube.

The total number of lines over which the scanning beam passes from the beginning of one complete image to the beginning of the next, is known as the total number of lines per frame. In the United States, the established standard is 525 lines per frame, 30 frames being produced per second. To reduce flicker in the reproduced image, interlacing is employed whereby the image is scanned in two groups of lines, so that 60 half-frames are produced per second. Thus the standard U.S. television receiver scans at a rate of 15,750 lines per second.

A single scanning line corresponds to 63.3 microseconds which at the speed of light, is 9.5 kilometers or 5.9 miles (5.1 nautical miles) round-trip from the start to the end thereof.

The width of the image relative to the height thereof in the rectangle actively employed in reproducing the image, is known as the aspect ratio. This ratio under U.S. television standards, is 4 to 3. Thus the height of the screen represents a distance of 4.3 miles (3.82 nautical miles) and the width thereof a distance of 5.9 miles (5.1 nautical miles). With a typical television receiver having a band width of 3.5 MHz, it becomes possible to resolve targets within 45 yards of the marine radar site.

A marine radar system in accordance with the invention, operates at a transmitter pulse repetition rate of 15,750 cycles per second, thereby matching the line scanning rate of the T-V receiver employed as a display device. The pulse width is approximately one-tenth of a microsecond. In a working embodiment of the invention, using a microwave source oscillating at a peak-transmitted power of 63.3 watts, a parabolic reflector 30 inches wide by 6 inches high, having 28 db gain and a receiver noise figure of 10 db, the following system sensitivities can be realized:

| Distance Nautical Miles | Target Size | Typical Targets |
| --- | --- | --- |
| 5.1 miles | 250 sq. meters | land masses |
| 4 miles | 50 sq. meters | large vessels |
| 3 miles | 16 sq. meters | pleasure craft 50 ft. |
| 2 miles | 3 sq. meters | smaller pleasure craft 30 ft. |
| 1 mile | 1 sq. meter | buoys, small craft 20 ft. |
| ½ mile | 0.2 sq. meter | buoys, small craft 10 ft. |
| 1,000 yards | 0.01 sq. meter | all obstacles. |

Figure 1:
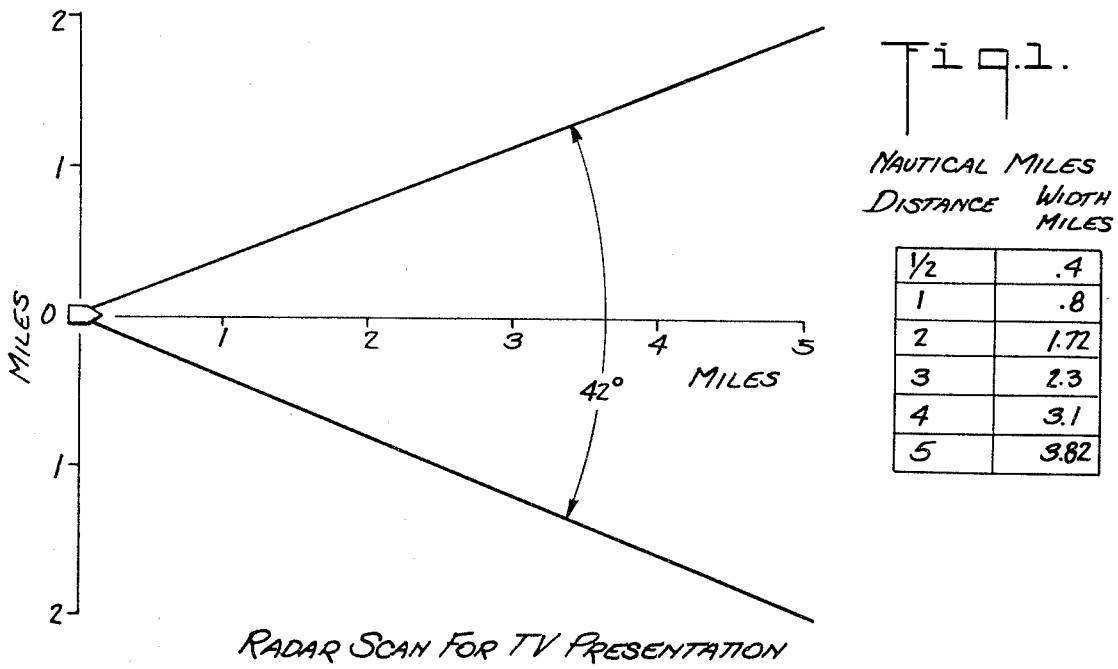
FIG. 1 illustrates an azimuthal sector periodically scanned by the antenna in a radar system in accordance with the invention.

Use is preferably made of a sector-scanning antenna adapted to scan 42° and then snap back to the starting point to simulate the scanning line motion. FIG. 1 shows the sector scanning angle and it will be seen that scanning takes place 21° left of the heading of the boat 10 in which the radar system is installed, and 21° right of the heading. Thus the region viewed by the radar system is that within the triangular boundaries of the sector.

Figure 2:
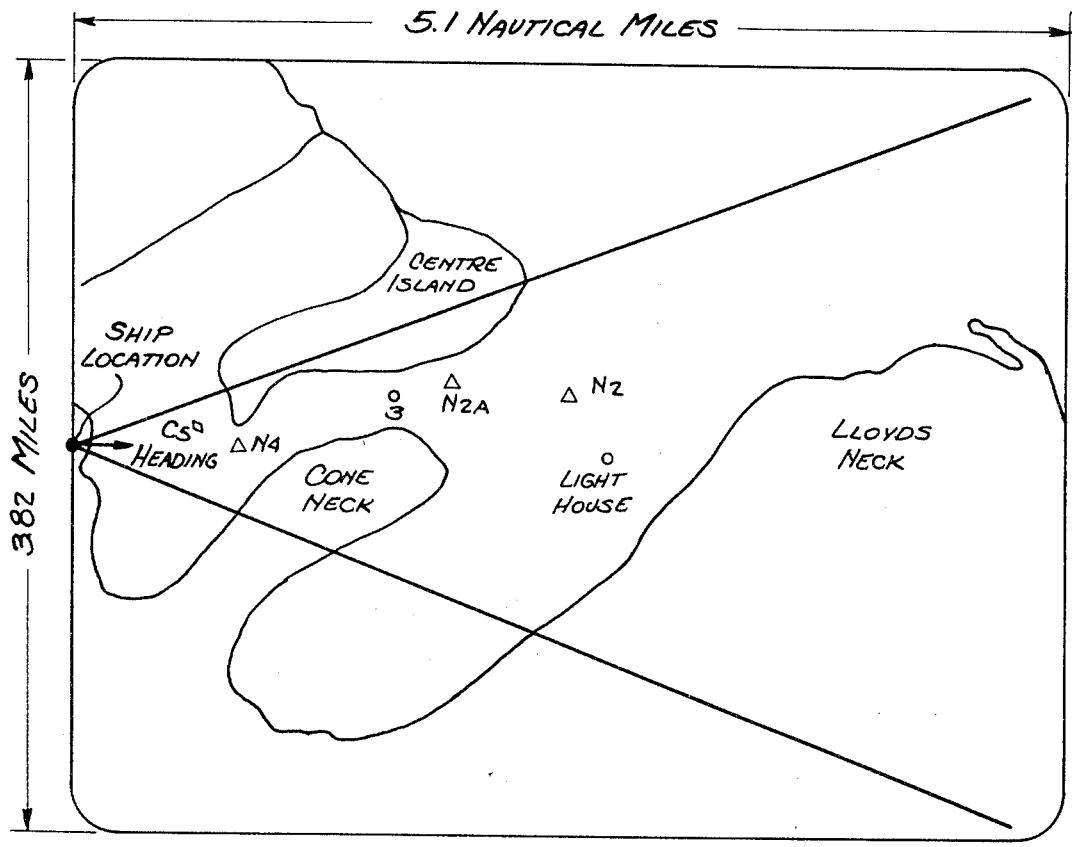
FIG. 2 shows the sector imposed on a marine chart.

Reference is now made to FIG. 2, wherein the scanned sector is imposed on a nautical chart lying within a 3.82 by 5.1 nautical miles rectangle. These distances, as pointed out previously, represent the maximum range of the radar system. It will be seen that the chart constitutes a true map projection, in that the relative dimensions of the targets or objects appearing on the chart, and their positions with respect to each other, are substantially free of distortion. However, it must be recognized that an observer on a boat does not see a true map presentation, for the more distant an object is from the eyes of the observer, the smaller it appears. To an observer on a boat, adjacent targets seem larger than distant targets.

In a PPI radar system, the center of the circular cathode-ray display screen represents the site of the scanning antenna, the electron beam being swept from the center of the tube to the periphery thereof to produce a radial trace which is rotated in synchronism with the rotating antenna, so that the screen presentation is a true map in polar coordinates of the region surrounding the site.

If, instead of scanning omni-directionally, the PPI system were to scan a 42° sector, then the PPI screen would display a true map of the sector scanned. But in the present invention as shown in FIG. 3, in which a rectangular T-V receiver screen is employed, the scanning site which is the ship's locaion, is represented at the midpoint of the left side of the screen rectangle, and the vertical scan of the cathode-ray beam is made to follow the angular position of the sector-scanning antenna. When, therefore, the beam is at the very top of the rectangular screen area, its position reflects the radar beam at the extreme left position, and when the beam is at the very bottom of the rectangular screen area, its position reflects the radar beam at its extreme right position.

As shown in FIG. 3, the rectangular screen covers 21° to the left of the ship's location and 21° to the right thereof. At each angular position of the sector scan, which is represented on the vertical scale of the screen, the cathode-ray beam is swept horizontally to produce a horizontal trace during which echoes received at this angle are painted in.

As a consequence, the presentation on the screen, while not a true map projection, is more in keeping with what an observer on the ship actually sees, for close-in targets appear much larger than targets situated at the extreme of the range covered by the system. While this modified map projection in which a triangular sector viewed by the radar system is converted into a rectangular area, (hereinafter called an S/R projection) somewhat exaggerates close-in targets, this exaggeration is of practical advantage, for it affords an expanded view of targets in the immediate vicinity of the boat, which is of greater concern to the small boat navigator than remote objects and land masses.

For example, if a larger freighter is but a few hundred yards from the boat carrying the radar system, this freighter will be seen in an exaggerated scale on the screen close to the radar site position thereon, as compared, say to a large ship two miles away. Assuming a dense fog in which the freighter is otherwise not visible, this exaggerated radar presentation will provide an immediate warning to the pilot.

Referring now to FIG. 4, there is shown the major components of a radar system in accordance with the invention, installed on a boat or other vessel or vehicle. Use is made of a standard (U.S.) T-V receiver 11, adapted to operate on the power available on the boat or by means of batteries. The receiver includes a cathode-ray screen 12, whose active image area is rectangular.

Since the T-V receiver, in a system in accordance with the invention, is not altered in any way, and is capable of providing the usual T-V reception for entertainment and information, one significant advantage of the invention is that the user not only is afforded a radar facility, but he also has available a conventional T-V receiver at no extra cost.

The radar system is adapted to generate video signals having a local carrier frequency corresponding to that of an unused channel on the T-V receiver, so that by adjusting the T-V channel selector to receive the radar channel, a radar S/R presentation is made available for navigation purposes, and by turning the selector to other channels, one receives the usual TV fare.

Mounted on a mast 13 on the boat or in the pilot house, is the combination of a radar antenna 14, a rotating scanner 15 and a base 16, housing the microwave assemblies and electronics for the radar system. Thus all components of the radar system other than the T-V receiver, are joined together in a compact package, thereby simplifying installation.

Antenna 14 preferably takes the form of a parabolic reflecting torus, operating in conjunction with a rotating scanner constituted by a cluster of four wave guide horns. The arrangement is such that as the horns rotate, they successively cooperate with the associated torus, and as each horn comes into play, it sweeps the radar beam across a 42° scan angle from a start point to a finish point, the next operative horn producing an identical sweep. Thus in effect, the radar beam describes a 42° sector and upon completion of the sector, immediately reverts to its start position to repeat the sector scan. Obviously, other known forms of sector-scanning systems may be used. Also provided is a control box 17 which is located on the boat at a convenient position and is connected to the radar system and the T-V receiver.

The synchronizing waveforms shown in FIGS. 5,6,7 and 8 are the standard forms for U.S. television. It will be appreciated, however, that the explanation which follows is applicable to any T-V standard.

As a matter of convention, T-V screens are scanned along horizontal lines from left to right, the lines progressing from top to bottom as on a printed page. One full transverse from top to bottom is designated as a "field" of scanning, the number of fields per second being known as the "field frequency," and the number of lines per second as the "horizontal frequency." T-V systems employ interlaced scanning, so that the scene during each frame is scanned twice, the system being so synchronized that the lines from alternate fields fill in the space between the original lines.

Thus in a radar system, in accordance with the invention, in which the radar picture is presented in a rectangular area on a T-V screen, the very top of the screen as shown in FIG. 3, represents the antenna beam at its extreme left, i.e., 21° to the left of the boat's heading, the distance or range being measured out from the left edge of the picture. Obviously, if so desired, one could mount the T-V set on a bracket or swivel whereby it could be rotated 90° from the normal viewing position, in which event, the lines from the ship's position on the screen would extend vertically. However, there is little ambiguity in the radar presentation when the normal T-V screen orientation is used.

Figure 5:
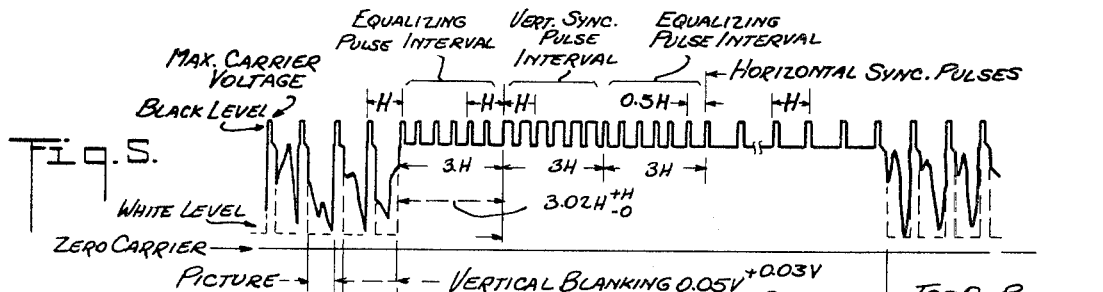
Figure 6:
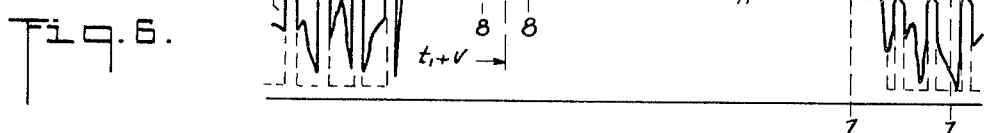
Figure 7:
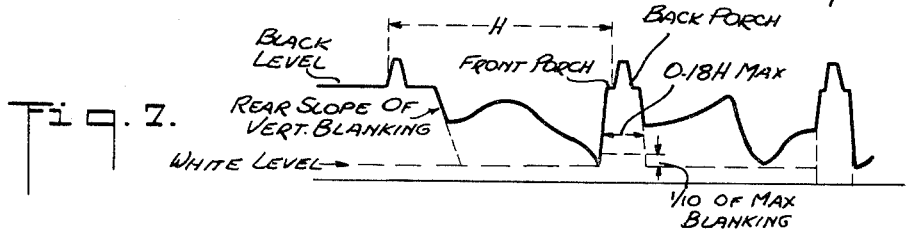
Figure 8:
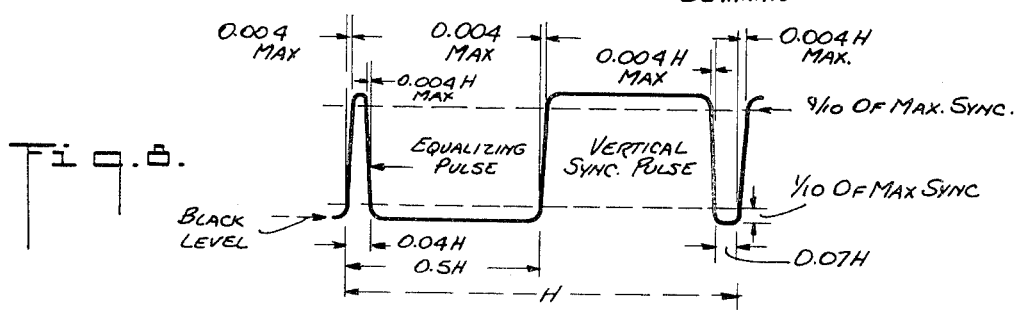

The waveform in FIG. 5 shows a composite video signal just prior to a vertical blanking signal, whereas that in FIG. 6 shows the same video information for the next field where a space of 0.5 H has been provided for interlacing. The waveform in FIG. 7, which is a detail between points 7—7 in FIG. 6, shows the transition from vertical blanking to picture and details of the horizontal pedestal or blanking signal. The waveform illustrated in FIG. 8 is a detail between points 8—8 in FIG. 6.

By convention, the absence of signals represents the white level on the screen, black being at the base of the horizontal sync pulse. Thus the synchronizing pulses are "blacker than black." In a radar system in accordance with the invention, the T-V screen appears white when no radar echoes are present, whereas targets show up as black spots on the screen.

The standard black-on-white T-V display can be reversed by suitable electronic circuits so that targets in a radar display are made to appear as white spots on a dark field. Alternatively, provision may be made to provide either type of presentation, depending on whether daylight or night-time viewing is desired. Night viewing on a dark screen with white targets would provide improved viewability aboard a darkened ship, whereas a white background with dark targets thereon would, in some respects, resemble a printed map presentation for daytime use.

Referring now to FIG. 9, the components of the radar system are shown in block form, control box 17 serving to switch on the necessary voltage which may be an A-C supply 18 or a 12V D-C battery supply 19.

A picture generator 20 is provided which includes a radio-frequency oscillator adapted to generate a local carrier at a frequency corresponding to that of an unused channel on the T-V receiver 11. In practice, a multi-channel oscillator may be provided so that the user may switch to a frequency which is unused in the region in which the system is operating. Picture generator 20 also includes a horizontal oscillator and a vertical oscillator so as to produce in effect, a synthetic T-V picture in which radar echoes can be viewed. The vertical sync circuit may be synchronized with the antenna sweep structure by means of a magnetic pick-up providing proper framing.

Also included is a microwave generator 21, such as a magnetron, operated by a modulator 22 to produce radar pulses at the appropriate repetition rate. Since this repetition rate must correspond to the line-scanning rate (15,750 $H_z$) of the T-V receiver, modulator 22 can be triggered by a trigger generator incorporated in the picture generator, or the modulator may itself produce a horizontal trigger pulse to synchronize the horizontal lines on the T-V receiver. Thus at the instant a radar pulse is transmitted, the electron beam proceeds to scan across the cathode-ray tube to produce indications thereon in response to echo signals and representing targets in the range corresponding to the scanning line.

In practice, one may use a microwave generator producing 60 watts peak power at 15,750 pulses per second, the pulses having a 0.1 microsecond width.

The horn cluster 15 which is energized by microwave source 21, is rotated by a scanning motor 23, the pulse output of the horns being successively directed onto the parabolic torus reflector 14, serving to focus the microwave energy into a beam. Rotation of the horn causes the projected radar beam to scan from left to right within the prescribed sector to follow the vertical transverse on the T-V screen.

A microwave switch 24 is built into the base of the antenna. The switch is arranged so that as one horn completes its sweep, the next horn in the cluster comes into position and during the vertical retrace interval, switching is carried out. In this way, the radar beam motion corresponds to the vertical "sawtooth" action of the cathode-ray beam. This, of course, could also be accomplished electronically with a diode array, or with a rotating antenna array with a suitable waveguide switch, or even by means of an oscillating antenna assembly. It is also not necessary to provide a full 42° sweep as shown in FIG. 1, for an acceptable presentation can be had with a smaller scanning angle, with the advantage of simplified antenna design and an expanded presentation.

Likewise, it may be advantageous to use submultiples of the normal line frequency to simplify the modulator and microwave source design, using fewer lines on the T-V screen to present the target returns. This reduced pulsatory rate can be designed to provide averaging of target returns in an optimum fashion.

The radar echoes return to and are picked up by the antenna, and through a transmit-receive device 25 (such as a gas-type TR tube duplexer), enter a microwave mixer 26. A microwave local oscillator 26 produces local oscillations which beat with the incoming echo signals to produce an IF frequency facilitating amplification of the radar return in an IF amplifier 27. The output of IF amplifier 27 is demodulated in detector 28 and is supplied to a video amplifier 29, as in a conventional radar. The echo signals in the output of amplifier 29 are then combined in picture generator 20 with the horizontal and vertical sync pulses to produce a composite video signal simulating a T-V signal and containing the desired radar information. The circuits of the elements constituting picture generator 20, namely, the horizontal oscillator, the vertical oscillator, the trigger generator and the T-V carrier generator, are the same as those included in existing forms of closed circuit T-V cameras. In a T-V closed circuit camera, video signals generated by the camera are combined with horizontal and vertical sync pulses to produce a composite video signal which is applied to a T-V display tube to create the desired T-V image, whereas in the present invention the output of the radar system is combined with these sync pulses to produce a composite video signal simulating a T-V signal which is applied to T-V set 11 to produce the desired radar image.

In one working embodiment of this system, the antenna was arranged to provide a scanning beam 3° or so wide in azimuth, and 20° wide in elevation, as in a typical marine radar. This can be accomplished by various means. One may use a parabolic torus as the basic beam-shaping reflector, fed by a moving horn rotating at a submultiple of the frame frequency (25 to 30 cps). By having four horns and a waveguide switch section, each horn in turn as it rotates, scans the parabolic torus causing the reflected beam to move a total of approximately 42°. As the beam reaches the extreme, the next horn comes into position to be energized by the waveguide switch section so the beam appears to snap back to the starting point (extreme left or right), depending on the system choice.

With a constantly rotating four-horn cluster as described, a "sawtooth" action of the antenna beam is obtained. For 30 frames per second, a rotation speed of 450 rpm is required. From this rotation, the vertical scanning pulse for the T-V set indicator is derived. In practice, a thin wall radome (plastic bowl) may be used to cover the rotating horns and to protect them from wind, rain, etc. The reflector remains stationary.

In the T-V receiver, the composite video signal from the radar system is displayed on the screen with azimuth plotted vertically, and distance to the target displayed horizontally, as shown in FIG. 3. Since the T-V indicator plots azimuth on one axis, the effect is to take the triangular sector (FIG. 1) and as shown on a true map (FIG. 2), stretch the presentation so that it more nearly approaches what the human eye sees looking ahead at the radar eye level.

This projection spreads out the display for targets in the proximity of the boat and enhances their presence, thereby obviating the crowding of such targets as seen on the conventional radar screen display. In the S/R projection, distortion disappears at the screen center, so that targets dead-ahead are shown exactly. Similarly distortion diminishes with distance and is negligible at the far edge.

Although a distance of only 5.1 miles is covered in the simple single scan arrangement, sensitivity time control circuits may be used to suppress signals representing close-in targets and to display only targets on the second scan (10.2 to 15 miles) or just display the third scan (15.2 to 20.4 miles).

Picture generator 20 includes a multi-frequency carrier oscillator and selector means to adjust said oscillator frequency to correspond to that of any channel in the television receiver.

While there has been shown and described a preferred embodiment of marine radar with T-V receiver display, in accordance with the invention, it will be appreciated that many changes and modifications may be made therein without, however, departing from the essential spirit of the invention.

I claim:

1. A radar system employing a standard multi-channel television receiver having a cathode-ray tube and means to effect electron beam scanning at a predetermined line frequency and at a predetermined vertical frequency, said reciver having at least one unused channel, said system including:

A. a radar antenna adapted to scan a predetermined azimuthal sector having a generally triangular configuration at a cyclical rate corresponding to said vertical frequency, B. means to supply microwave pulses to said antenna at a repetition rate corresponding to said line scanning frequency or to a submultiple thereof to produce a radar beam for scanning said sector, C. means coupled to said antenna to derive therefrom echo signals representing reflecting targets intercepting said radar beam, D. a picture generator including means to produce a local carrier whose frequency corresponds to said unused channel, means to produce horizontal sync pulses corresponding to said repetition rate, means to produce vertical sync pulses corresponding to said cyclical rate and means to combine said horizontal and vertical sync pulses with said echo signals and said local carrier carrier to produce a composite video signal simulating a television signal, and E. means to apply said composite video signal to said receiver to produce on the screen thereof, a rectangular radar picture in which images of targets lying within said sector having a triangular configuration, which are adjacent the radar antenna that is represented at the apex of the sector, are expanded in the rectangular picture relative to those remote therefrom.

2. A system as set forth in claim 1, wherein said line scanning frequency is 15,750 lines per second.

3. A system as set forth in claim 1, wherein said radar antenna is constituted by a stationary reflector and rotating horn cluster operating in conjunction with a switch to render the horn in the cluster successively active with respect to said reflector.

4. A system as set forth in claim 1, wherein said azimuthal sector is about 40°.

5. A system as set forth in claim 1, wherein said means to supply said pulses is constituted by a magnetron generator operating in conjunction with a modulator serving to activate said generator at the specified repetition rate.

6. A system as set forth in claim 1, further including means to shift the position of said antenna in azimuth to adjust the direction of said sector.

7. A system as set forth in claim 1, wherein said means to derive said echo pulses includes a local oscillator, means to beat reflective signals picked up by said antenna with the output of said local oscillator to produce an intermediate frequency signal, and means to amplify and detect said intermediate frequency signal to produce said echo signals.

8. A system as set forth in claim 1, wherein said picture generator includes a multi-frequency carrier oscillator and selector means to adjust said oscillator frequency to correspond to that of any channel in said television receiver.

* * * * *